(12) United States Patent
Barajas

(10) Patent No.: US 8,205,985 B1
(45) Date of Patent: Jun. 26, 2012

(54) HAT-MOUNTED EYEWEAR

(76) Inventor: Arthur Barajas, Ceres, CA (US)

( * ) Notice: Subject to any disclaimer, the term of this patent is extended or adjusted under 35 U.S.C. 154(b) by 99 days.

(21) Appl. No.: 12/767,918

(22) Filed: Apr. 27, 2010

(51) Int. Cl.
    *G02C 3/00* (2006.01)
(52) U.S. Cl. .................... 351/155; 2/10; 2/453
(58) Field of Classification Search .......... 351/41, 351/155, 158; 2/10, 12, 13, 453
    See application file for complete search history.

(56) References Cited

U.S. PATENT DOCUMENTS

| | | | |
|---|---|---|---|
| 5,687,420 A | 11/1997 | Chong | |
| 5,778,448 A | 7/1998 | Maher | |
| 5,860,167 A | 1/1999 | Lizio | |
| 6,237,159 B1 | 5/2001 | Martin | |
| 6,397,396 B1 | 6/2002 | Vibert | |
| 6,553,570 B1 | 4/2003 | Flynn | |
| 6,647,554 B1 | 11/2003 | Yan | |
| 6,892,393 B1 * | 5/2005 | Provost et al. | 2/10 |
| 7,207,673 B1 | 4/2007 | Ho | |
| 7,325,920 B1 * | 2/2008 | Gelfuso et al. | 351/155 |
| 7,343,630 B2 | 3/2008 | Lee | |

* cited by examiner

*Primary Examiner* — Huy K Mai
(74) *Attorney, Agent, or Firm* — Montgomery Patent & Design, LLC; Robert C. Montgomery; Joseph T. Yaksich

(57) ABSTRACT

Eyewear mountable thereto an existing baseball style cap is herein disclosed, comprising a similar appearance and utilization as a standard pair of sunglasses and a separate baseball cap; however, a modified earpiece is routed upward and fastened to the lower edge of the baseball cap with a free-turning assembly on each side of the cap. In use, the eyewear pivots around and down to the underside of the bill for use and pivots back to the top of the bill for storage.

16 Claims, 6 Drawing Sheets

HAT-MOUNTED EYEWEAR

RELATED APPLICATIONS

The present invention was first described in a notarized Official Record of Invention on Nov. 20, 2008, that is on file at the offices of Montgomery Patent and Design, LLC, the entire disclosures of which are incorporated herein by reference.

FIELD OF THE INVENTION

The present invention relates generally to apparatuses intended for use in painting chalk lines, and in particular, to an apparatus and guiding mechanism for the simultaneous painting of parallel dotted lines.

BACKGROUND OF THE INVENTION

Sunglasses are ubiquitous in modern society. Their use as a fashion accessory and their effectiveness at providing shade for the eyes in situations of excessively bright lighting lend a wide appeal to such products. Modern accoutrements such as ultraviolet radiation (UV) protective features and polarized lenses have only served to increase popularity.

A presiding problem with glasses in general and sunglasses in particular is their relatively fragile nature. The thin frames are prone to bending or breaking when placed in unnatural or stressful positions. This makes the storage of such items difficult, especially while out of the house. Sunglasses in particular are often removed and replaced repeatedly over the course of a day as lighting conditions change with the weather, moving indoors and outdoors, etc. For many persons, carrying a suitable protective case for the glasses is annoying at best, but simpler remedies such as placing the glasses on one's head or in a pocket often lead to accidently dropping, crushing, or bending the frames or simply losing the glasses.

Various attempts have been made to provide hats with capabilities for securely retaining sunglasses or providing eye shading capabilities. Examples of these attempts can be seen by reference to several U.S. patents. U.S. Pat. No. 5,687,420, issued in the name of Chang, describes an apparatus for affixing sunshades to a baseball-style cap. The Chang apparatus includes a pair of shaded lenses with integral clips and hinges which secure to the brim of the hat.

U.S. Pat. No. 6,397,396, issued in the name of Vibert, describes a ball cap with attached sunglasses. The Vibert apparatus includes a baseball-style cap with integrally attached rotating sunglasses.

U.S. Pat. No. 6,647,554, issued in the name of Yan, describes a cap with a versatile sunglasses retainer. The Yan apparatus includes a securing means integrally located on the outside of a baseball-style cap which allows a user to securely place a pair of sunglasses on top of the cap during periods of disuse in a conventional manner.

While these apparatuses fulfill their respective, particular objectives, each of these references suffer from one (1) or more of the aforementioned disadvantages. Many such apparatuses do not allow a user to utilize the apparatus with existing baseball caps. Also, many such apparatuses do not provide a full range of pivotal motion for sunglasses. Additionally, many such apparatuses do not provide the user with the option of utilizing the sunglasses in a standard manner without the use of a baseball cap. Furthermore, many such apparatuses are not adaptable to forms of headwear other than baseball caps. Accordingly, there exists a need for a hat-mounted sunglass system without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a hat-mounted sunglasses system which is retrofittable to existing hats, which provide security to sunglasses during period of use and disuse, and which allows a user the flexibility to utilize the glasses in the normal manner without the use of a hat. Thus, the object of the present invention is to solve the aforementioned disadvantages and provide for this need.

To achieve the above objectives, it is an object of the present invention to comprise a clip portion, eyewear, and a protuberant. The apparatus is removably attachable and rotatable to conventional hats, caps, or the like.

Another object of the present invention is to position the eyewear on a user's face in a manner similar to conventional eyewear with a temple portion parallel to the temple region and a bridge portion resting on the bridge of the user's nose. The clip portion is utilized in order to secure the eyewear to a hat.

Yet still another object of the present invention is to rotate in a circular motion about an axis created from a protuberant, enabling the apparatus to be positioned in a stored position on top of a hat. In use, while the clip portion is secured to a ball cap and the cap is removed from the user, the eyewear may be rotated around the back of the cap and upward to a stored position resting upon a brim portion of the hat.

Yet still another object of the present invention is to comprise eyewear similar to conventional eyeglasses. The eyewear comprises common features such as a frame portion, a pair of temple portions, a bridge portion, a pair of lenses, and a pair of hinges. The lenses provide protection to a user from harmful lighting in the manner of conventional sunglasses.

Yet still another object of the present invention is to further comprise the frame portion of a pair of standard temple portions which provide an attachment means for the apparatus to a hat. The temple portions are positioned above the ears of a user. An inside portion of each temple portion comprises an aperture which provides an attachment means to the clip portion.

Yet still another object of the present invention is to position the apertures along an inside portion of the temple portion at an intermediate location and comprising an appropriate depth for accepting the protuberant.

Yet still another object of the present invention is to comprise the clip portions of an outside clip element, an inside clip element, and a protuberant which provide an attachment means between a hat and the eyewear. In a preferred embodiment, the clip portion comprises a conventional removably attachable "R"-shaped cinching device.

Yet still another object of the present invention is to comprise the protuberant of appropriate dimensions to securely engage the apertures, thereby providing a desired attachment position for the clip portion to the temple portion and also to the hat. The protuberant allows for the apparatus to fully rotate about the imaginary axis of the aperture and protuberant to a stored position.

Yet still another object of the present invention is to provide a method of utilizing the apparatus that provides a unique means of locating the clip portions on an existing hat, engaging the protuberants with the apertures of the eyewear, and selectively rotating the eyewear between a comfortable worn position whence the lenses provide protection from harmful lighting and a stored position with the eyewear securely located atop the hat.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
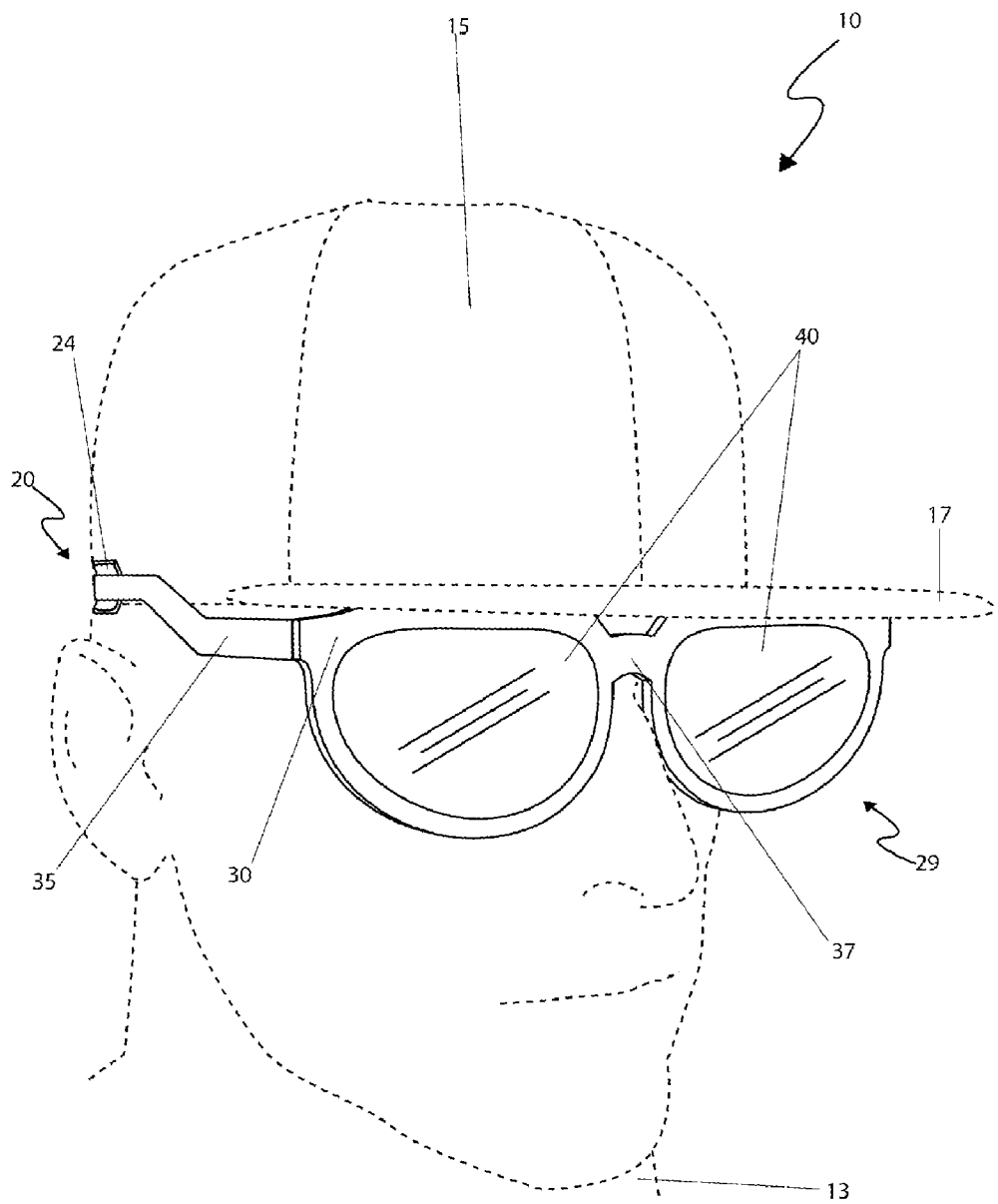
FIG. 1 is an environmental view of hat-mounted eyewear 10, according to a preferred embodiment of the present invention.

| DESCRIPTIVE KEY | |
|---|---|
| 10 | hat-mounted eyewear |
| 13 | user |
| 15 | hat |
| 17 | brim portion |
| 20 | clip portion |
| 22 | outside clip element |
| 24 | inside clip element |
| 26 | aperture |
| 29 | eyewear |
| 30 | frame portion |
| 35 | temple portion |
| 36 | protuberant |
| 37 | bridge portion |
| 40 | lens |
| 50 | spring hinge |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes hat-mounted eyewear (herein described as the "apparatus") 10, which provides a user 13 with a facial accessory thereto protect said users 13 eyes from ultraviolet radiation. Said apparatus 10 comprises a clip portion 20, eyewear 29, and a protuberant 36. Said apparatus 10 is removably attachable and rotatable to conventional hats, caps, or the like. The materials required to produce said apparatus 10 are readily available and well known to manufacturers of goods of this type.

Figure 2:
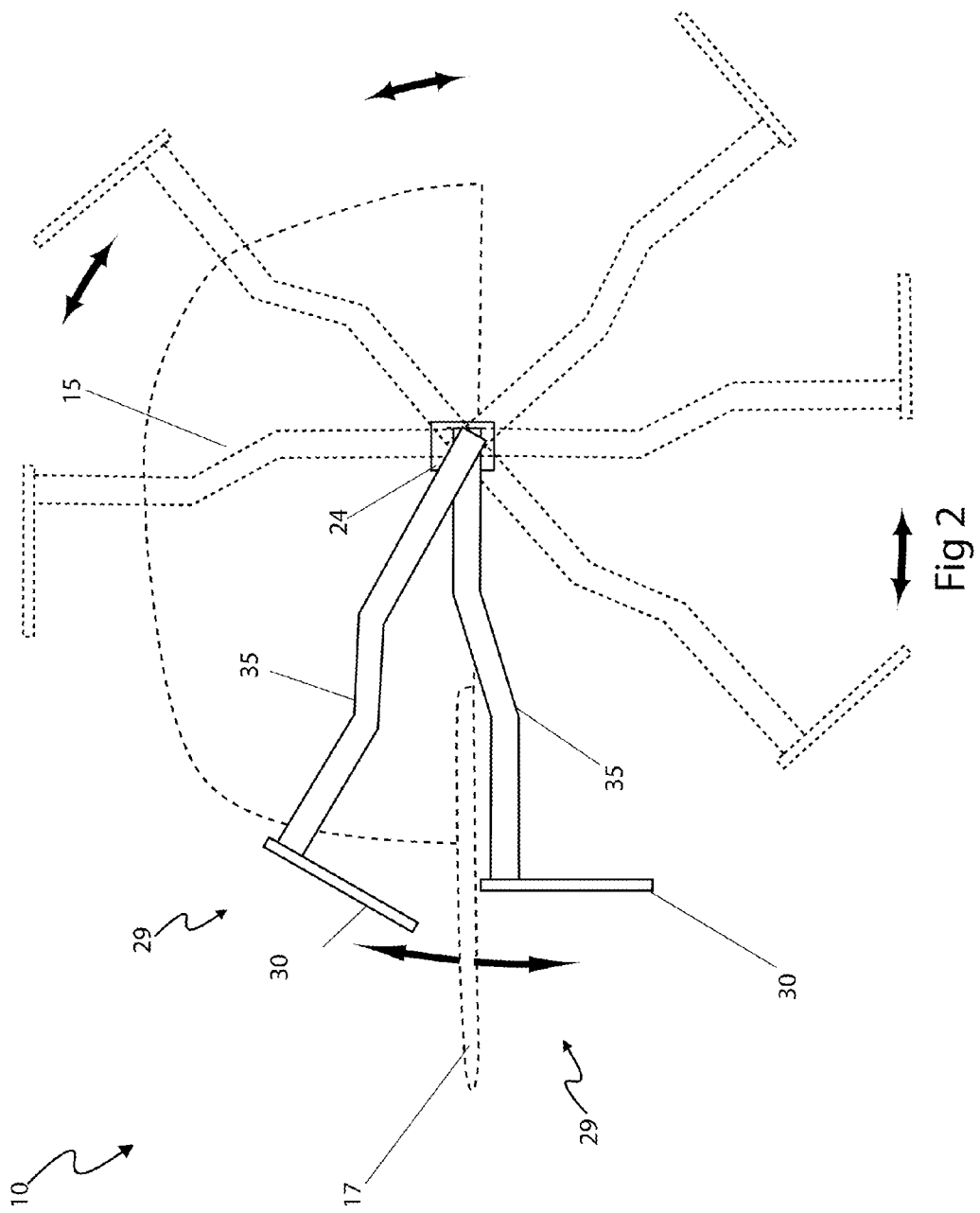
FIG. 2 is a side view of hat-mounted eyewear 10 depicting transition therefrom a utilized thereto a stored position, according to a preferred embodiment of the present invention.

Referring now to FIG. 1, an environmental view of the apparatus 10 and FIG. 2, a side view of the apparatus 10 depicting transition therefrom a utilized thereto a stored position, according to the preferred embodiment of the present invention, are disclosed. In use, the apparatus 10 is positioned on the users 13 face similar to conventional eyewear 29, eyeglasses, or the like therewith a temple portion 35 parallel to the temple region thereabove the ears thereon the users 13 face and a bridge portion 37 resting thereupon the bridge of the users 13 nose. Said apparatus 10 is also secured to a hat 15 therewith an integral clip portion 20 (also see FIG. 4), thereby prohibiting the eyewear 29 from accidentally descending from the user's face and also eliminating unwanted pressure thereon the user's 13 ears or temple region.

Said apparatus 10 further rotates in a circular motion about an axis created from a protuberant 36 (see FIG. 3), thereby enabling said apparatus 10 to be positioned in a stored position. In use, while the clip portion 20 is secured to the hat 15 and said hat 15 is removed from the user 13 the eyewear 29 may be rotated in a counterclockwise direction to a stored position resting thereupon a brim portion 17 of the hat 15. When needed the eyewear 29 are rotated in a clockwise direction for utilization.

Figure 3:
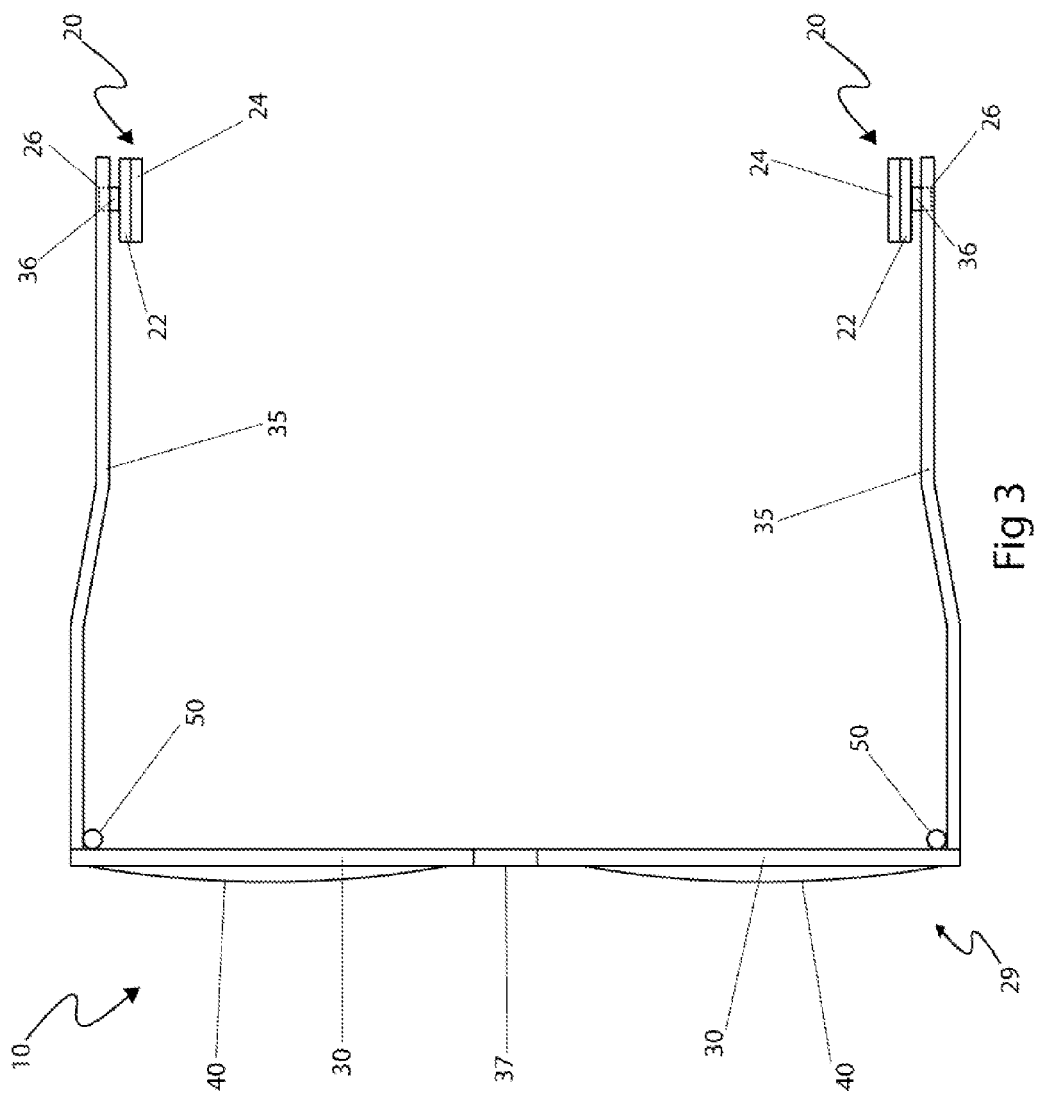
FIG. 3 is a top view of hat-mounted eyewear 10, according to a preferred embodiment of the present invention.

Referring now to FIG. 3, a top view of the apparatus 10, according to the preferred embodiment of the present invention, is disclosed. The apparatus 10 comprises eyewear 29 similar to conventional eyeglasses as abovementioned. Said eyewear 29 is depicted here comprising a standard rectangular shape for illustration purposes only; it is known that other styles of eyewear may be utilized without limiting the functions of the apparatus 10. Said eyewear 29 comprises a frame portion 30, a pair of temple portions 35, a bridge portion 37, a pair of lenses 40, and a pair of hinges 50. The eyewear 29 is preferably manufactured from materials such as, but not limited to: plastic, metal, or the like in a variety of colors and patterns.

The conventional frame portion 30 sustains a pair of lenses 40 that which protect the user 13 from harmful lighting. Each lens 40 comprises a concave shape and is installed therewithin the frame portion 30. Each lens 40 is also preferably fabricated from a tinted plastic or glass. Therebetween said lens 40 is a bridge portion 37 which provides a position for the user 13 to position the eyewear 29 thereon the bridge of their nose further aligning each lens 40 thereto the user's 13 eyes. Said bridge portion 37 is preferably a molded in an integral fashion therewith the frame portion 30. The frame portion 30 is positioned subjacent to a brim portion 17 of an existing hat 15.

The frame portion 30 also comprises a pair of standard temple portions 35, thereby providing an attachment means for the apparatus to the hat 15. Said temple portions 35 are similar thereto conventional eyeglasses and is located perpendicular to the frame portion 30 thereon each distal end portion. Said temple portion 35 bends slightly upward thereto align with the lower edge portion of the hat 15. Said temple portions 35 are preferably positioned thereabove the ears of a user 13. An inside portion of each temple portion 35 comprises an aperture 26, thereby providing the apparatus 10 with an attachment means thereto the clip portion 20 and further to the hat 15. Said apertures 26 are positioned therealong an inside portion of the temple portion 35 as abovementioned at an intermediate location and comprise an appropriate depth thereto accept a protuberant 36 as described herein below. Said temple portion 35 also comprises a hinging means, thereby enabling said temple portion 35 to collapse inwardly into a storable state (also see FIG. 6). The temple portions 35 are preferably fabricated from a similar material as the frame portion 30 and are an appropriate length to enable placement above the ears of the user 13 and secure to a hat 15.

Figure 4:
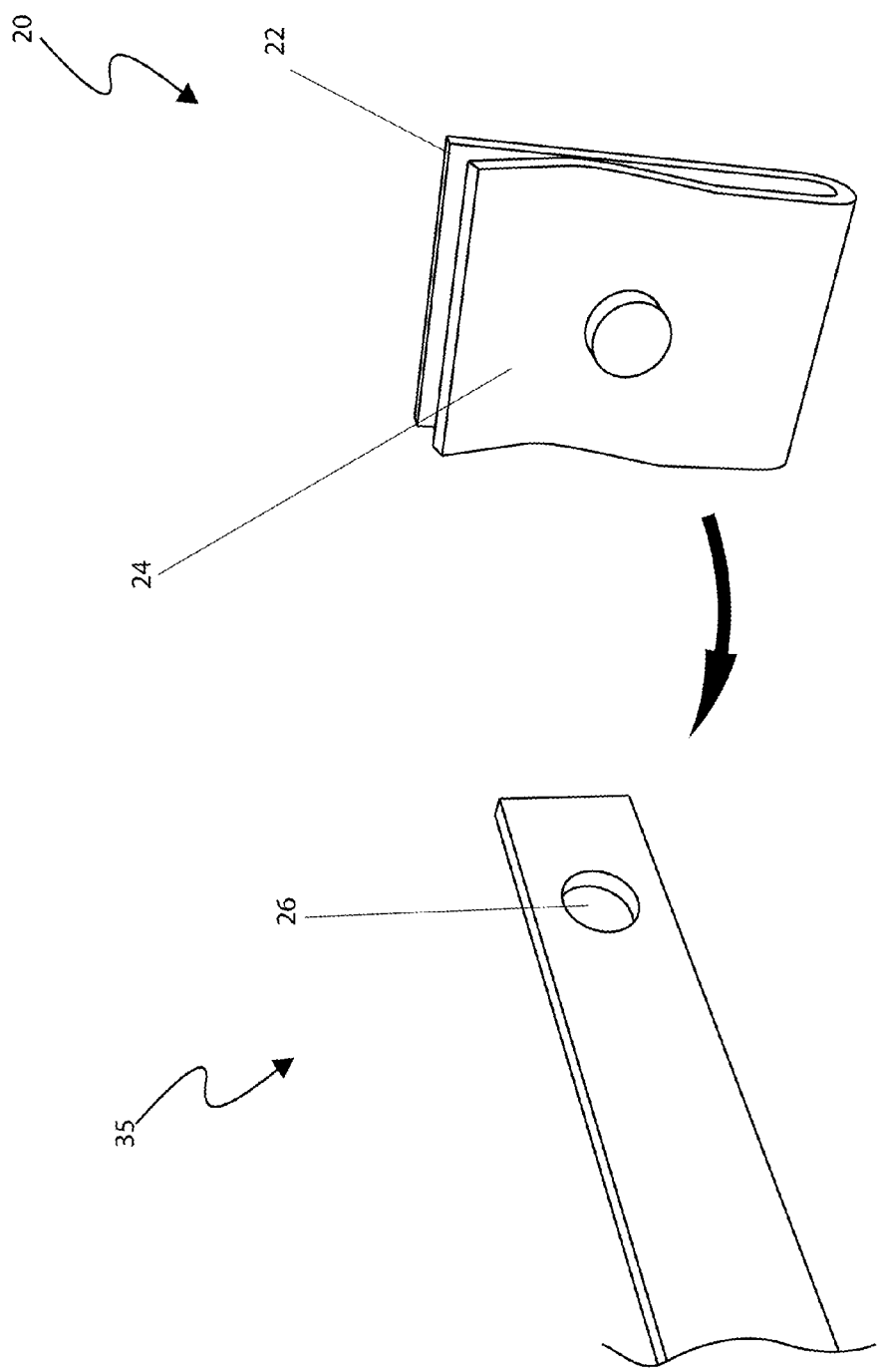
FIG. 4 is a partially exploded perspective view of a clip portion 20 and temple portion 35, according to a preferred embodiment of the present invention.
Figure 5:
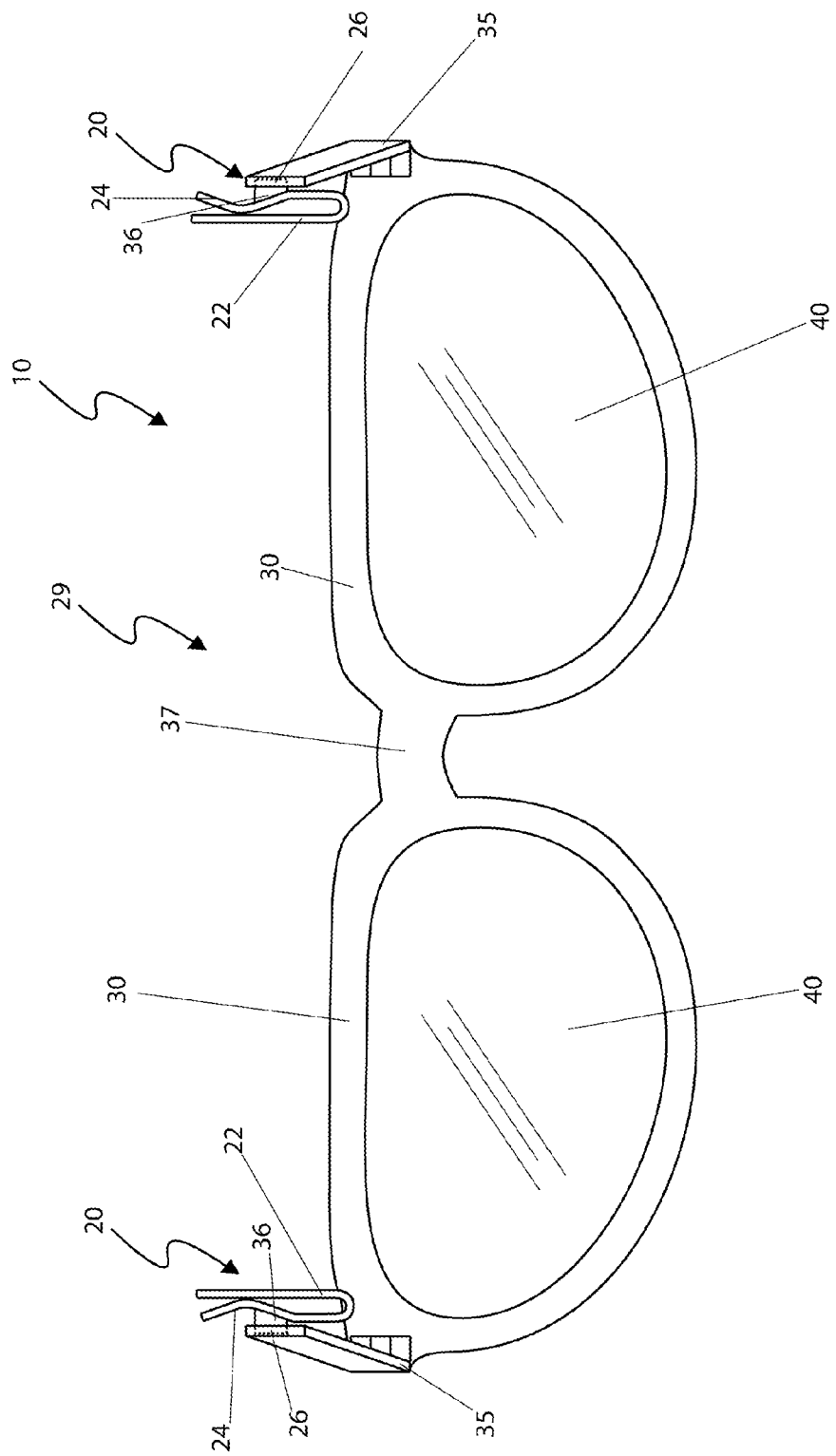
FIG. 5 is a rear view of hat-mounted eyewear 10, according to a preferred embodiment of the present invention; and, FIG. 6 is a perspective view of hat-mounted eyewear 10, according to a preferred embodiment of the present invention.

The apparatus 10 also comprises a pair of clip portions 20, thereby providing an attachment means to an existing hat 15 (also see FIGS. 4 and 5). Said clip portions 20 comprises an outside clip element 22, an inside clip element 24, and a protuberant 36. Said clip portions 30 are comprised of appropriate dimensions to enable said clip portion 20 to be slightly offset from the user's 13 head, thereby prohibiting extension beyond the ears of the user 13. Said clip portions 20 engage an aperture 26 located thereon the temple portion 35 via an interference fitting means of an integral protuberant 36. Said protuberant 36 engages a desired abovementioned aperture 26, thereby providing the user 13 a desired attachment position for the clip portion 20 to the temple portion 35 and also to the hat 15. The protuberant 36 also allows for the apparatus 10 to fully rotate about the imaginary axis of the aperture 26 and protuberant 36 to a stored position thereon the brim portion 17.

Referring now to FIG. 4, a partially exploded perspective view of a clip portion 20 and temple portion 35 and FIG. 5, a rear view of the apparatus 10, according to the preferred embodiment of the present invention, are disclosed. The clip portion 20 comprises an outside clip element 22, an inside clip element 24, and the protuberant 36. Said clip portion 20 is preferably a conventional removably attachable "R"-shaped cinching device utilized to secure the hat 15 therebetween the clip elements 22, 24. The inside clip element 24 comprises a curved rectangular shape which slightly comes in contact with the inside clip element 22 which also comprises the protuberant 36. Said protuberant 36 is located thereon a lower portion of the inside clip element 24 and comprises appropriate dimensions thereto engage an aperture 26. Said inside clip element 24 comprises a member which bends inwardly toward an inside portion of the outside clip element 22 and provides a securing means to the hat 15. In use, the inside clip element 24 is positioned adjacently to an inner portion of the temple portion 35 therewith the protuberant 36 aligned with the aperture 26. The outside clip element 22 is an integral part of the inside clip element 24 which comprise a slight gap therebetween, thereby enabling for the hat 15 to be slidably inserted among each element 22, 24. Said outside clip 22 comprises a rectangular shape which slightly comes in contact with the inside clip element 22. The outside clip element 22 is positioned thereon a concealed inside portion of the hat 15. The clip portion 20 is preferably fabricated from a material such as, but not limited to: metal, plastic, or the like.

Figure 6:
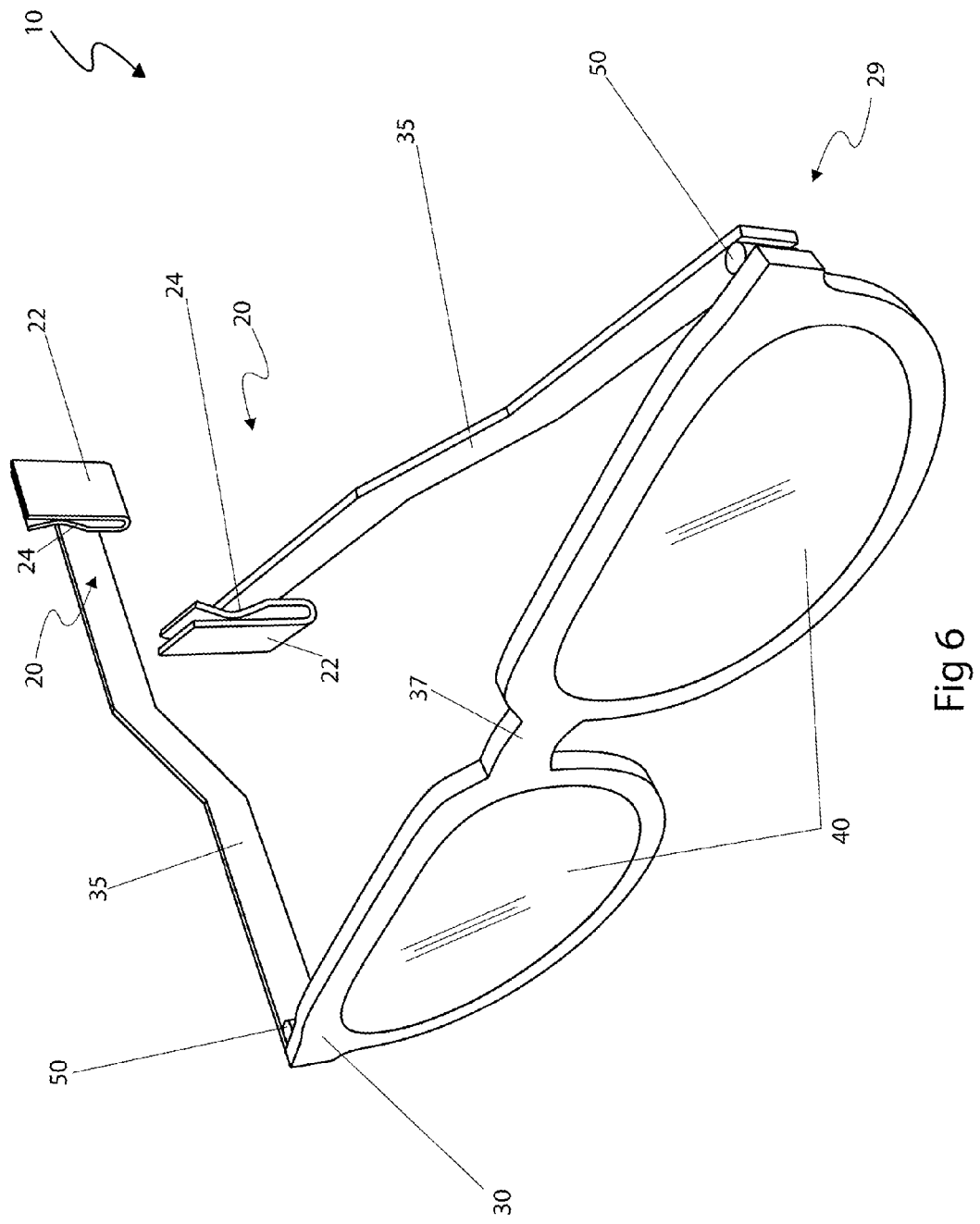

Referring now to FIG. 6, a perspective view of the apparatus 10, according to the preferred embodiment of the present invention, is disclosed. The apparatus 10 comprises a conventional hinging means, thereby enabling each temple portion 35 to be folded inwardly toward a rear portion of the frame portion 30. Said hinging means comprises a pair of conventional spring hinges 50 which are located therebetween the temple portion 35 and the frame portion 30. Said spring hinges 50 are fabricated from materials such as, but not limited to: nickel, stainless steel, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 through 6.

The method of installing and utilizing the apparatus 10 may be achieved by performing the following steps: acquiring the apparatus 10; engaging the clip portion 20 therewith the aperture 26 thereon the inner portion of the temple portion 35; positioning the apparatus 10 thereon the face of a user 13 therewith the bridge portion 37 resting thereon the bridge of said user's 13 nose and the temple portion 35 parallel to said users temple; slidably engaging the existing hat 15 among the outside clip element 22 and inside clip element 24, thereby clinching the hat 15 therebetween the clip portion 20; rotating the apparatus 10 to a stored position thereon the brim portion 17 of the hat 15 as necessary, thereby removing the hat 15 from the user 13 and allowing the protuberant 36 to rotate counterclockwise therein the aperture 26 until the resting position is reached and positioning the hat 15 thereon the user 13; removing the hat 15 and rotating the apparatus 10 to the installed position as necessary; disengaging the hat 15 from the clip portion 20 as necessary; storing the apparatus 10, thereby folding the temple portions 35 inwardly enabling each spring hinge 50 to rotate; utilizing said apparatus 10 to protect the user's 13 vision; and, enjoying the convenient usages of said apparatus 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention. application:

What is claimed is:
1. Eyewear, comprising:
   a frame, further comprising:
      a lens frame portion;
      a pair of lenses disposed within said lens frame portion;
      a pair of temple portions, each having a proximal end hingedly affixed to either outer end of said lens frame portion and a distal end comprising an aperture on an inner surface; and
      a bridge comprising an integral central portion of said lens frame portion and disposed between said pair of lenses; and,
   a pair of clips removably fastened to said aperture of said frame on opposing ends thereof;
   wherein said eyewear provides a protective means from undesirable pressure on ears of a user;

wherein said eyewear is removably attachable to a support device;
wherein said eyewear is rotatably adaptable with respect to said support device;
wherein said pair of temple portions are hingedly affixed to said lens frame portion in order to compactly fold said eyewear; and,
wherein said bridge enables a user to position said eyewear to align said pair of lenses with a pair of eyes for said user.

2. The eyewear of claim 1, wherein each of said pair of temple portions comprises a slight upward bend to enable said pair of clips to removably attach said eyewear to a lower edge portion of said support device.

3. The eyewear of claim 1, wherein said pair of clips each comprise:
a unitary clip body, comprising an outside clip element and an inside clip element defining a gap between; and,
a protuberant outwardly extending therefrom said inside clip element;
wherein said outside clip element and said inside clip element engage said support device within said gap and provide a securing attachment thereto;
wherein said protuberant is removably attached to one of said aperture of said pair of temple portions; and,
wherein said protuberant is rotatably engaged within one of said aperture of said pair of temple portions, thereby providing a rotation for said eyewear with respect to said support device.

4. The eyewear of claim 3, wherein said clip comprises a dimension enabling it to be offset from a head of said user, thereby prohibiting extension beyond ears of said user.

5. The eyewear of claim 1, wherein said pair of lenses further comprises prescription lenses.

6. The eyewear of claim 1, wherein said pair of lenses further comprises ultraviolet protection.

7. The eyewear of claim 6, wherein said pair of lenses further comprises prescription lenses.

8. Eyewear rotatably mounted to a hat, comprising:
a frame, further comprising:
a lens frame portion;
a pair of lenses disposed within said lens frame portion;
a pair of temple portions, each having a proximal end hingedly affixed to either outer end of said lens frame portion and a distal end comprising an aperture on an inner surface; and
a bridge comprising an integral central portion of said lens frame portion and disposed between said pair of lenses; and,
a pair of clips rotatably attached to apertures located on said opposing pair of temple portions of said frame;
wherein said eyewear provides a protective means from undesirable pressure on ears of a user;
wherein said eyewear is removably attachable to said hat; and,
wherein said eyewear is rotatably adaptable with respect to said hat between a deployed state and a stored state;
wherein said pair of temple portions are hingedly affixed to said lens frame portion in order to compactly fold said eyewear; and,
wherein said bridge enables a user to position said eyewear to align said pair of lenses with a pair of eyes for said user.

9. The eyewear of claim 8, wherein each of said pair of temple portions comprises a slight upward bend to enable said pair of clips to removably attach said eyewear to a lower edge portion of said hat.

10. The eyewear of claim 8, wherein said pair of clips each comprise:
a unitary clip body, comprising an outside clip element and an inside clip element defining a gap between; and,
a protuberant outwardly extending therefrom said inside clip element;
wherein said outside clip element and said inside clip element engage said hat within said gap and provide a securing attachment thereto;
wherein said protuberant is removably attached to one of said aperture of said pair of temple portions; and,
wherein said protuberant is rotatably engaged within one of said aperture of said pair of temple portions, thereby providing a rotation for said eyewear with respect to said hat between said deployed state and said stored state.

11. The eyewear of claim 10, wherein said clip comprises a dimension enabling it to be offset from a head of said user, thereby prohibiting extension beyond ears of said user.

12. The eyewear of claim 8, wherein said pair of lenses further comprises prescription lenses.

13. The eyewear of claim 8, wherein said pair of lenses further comprises ultraviolet protection.

14. The eyewear of claim 13, wherein said pair of lenses further comprises prescription lenses.

15. A method for removably attaching eyewear to a hat comprises the following steps:
providing said eyewear, further comprising:
a frame, comprising a lens frame portion, a pair of lenses disposed within said lens frame portion, a pair of temple portions, each comprising a slight upward bend and having a proximal end hingedly affixed to either outer end of said lens frame portion and a distal end comprising an aperture on an inner surface, and a bridge comprising an integral central portion of said lens frame portion and disposed between said pair of lenses; and,
a pair of clips each, further comprising an outside clip element and an inside clip element defining a gap between, and a protuberant outwardly extending therefrom said inside clip element rotatably attached to an aperture of opposing pair of temple portions of said frame a unitary clip body;
positioning said eyewear on a face of a user by manipulating said bridge portion onto a bridge of a nose of said user such that said pair of lenses is positioned in front of eyes of said user; and,
slidably engaging said hat within said gap of each of said pair of clips, thereby securing said eyewear to said hat.

16. The method of claim 15, further comprising the steps of rotating said eyewear with respect to said hat between a stored position above a brim of said hat and said deployed position;
wherein said rotating step is accomplished by rotating said protuberances of each of said pair of clips within said apertures of each of said pair of temple portions.

* * * * *